US006875377B1

(12) United States Patent
Shilton

(10) Patent No.: US 6,875,377 B1
(45) Date of Patent: Apr. 5, 2005

(54) GAMMA RADIATION SOURCE

(75) Inventor: Mark Golder Shilton, Aston Clinton (GB)

(73) Assignee: AEA Technology PLC, Didcot (GB)

( * ) Notice: Subject to any disclaimer, the term of this patent is extended or adjusted under 35 U.S.C. 154(b) by 0 days.

(21) Appl. No.: 09/959,125

(22) PCT Filed: Apr. 20, 2000

(86) PCT No.: PCT/GB00/01549

§ 371 (c)(1), (2), (4) Date: Oct. 22, 2001

(87) PCT Pub. No.: WO00/65608

PCT Pub. Date: Nov. 2, 2000

(30) Foreign Application Priority Data

Apr. 27, 1999 (GB) ............................................ 9909531

(51) Int. Cl.[7] ............................ G21G 4/02; G21G 1/06; G21F 5/02; C01B 19/04; C22C 43/00

(52) U.S. Cl. ....................... 252/644; 252/645; 252/625; 423/508; 423/509; 423/510; 420/1; 420/579; 420/424; 420/429; 420/462; 250/390.01; 250/496.1

(58) Field of Search ................................. 252/625, 644, 252/645; 423/508, 509, 510; 420/1, 579, 424, 429, 462; 250/390.01, 496.1

(56) References Cited

U.S. PATENT DOCUMENTS

| | | | | | |
|---|---|---|---|---|---|
| 3,655,348 | A | * | 4/1972 | Bither, Jr. | 423/299 |
| 3,791,867 | A | * | 2/1974 | Broadhead et al. | 429/323 |
| 3,952,030 | A | * | 4/1976 | Chambers et al. | 552/505 |
| 4,030,886 | A | * | 6/1977 | Bayly et al. | 436/541 |
| 4,202,976 | A | * | 5/1980 | Bayly et al. | 544/261 |
| 4,647,386 | A | * | 3/1987 | Jamison | 508/150 |
| 4,654,281 | A | * | 3/1987 | Anderman et al. | 429/209 |
| 4,738,318 | A | * | 4/1988 | Boettcher et al. | 174/73.1 |

FOREIGN PATENT DOCUMENTS

WO WO 94/24546 * 10/1994

OTHER PUBLICATIONS

XP–000915394, Journal of the Less–Common Metals, 62 (1978) 343–348.*

XP–000937487, Poroshkovaya Metallurgia, No 9(249), pp. 13–17 Sep. 1983.*

XP–000896098, Med. Phys. 13 (5) Sep./Oct. 1986.*

* cited by examiner

*Primary Examiner*—Joseph D. Anthony

(74) *Attorney, Agent, or Firm*—William H. Holt

(57) ABSTRACT

A gamma radiation source comprising selenium-75 or a precursor therefore, wherein the selenium is provided in the form of one or more thermally stable compounds, alloys, or mixed metal phases.

25 Claims, 1 Drawing Sheet

GAMMA RADIATION SOURCE

The present invention relates to a gamma radiation source containing $^{75}$Se, and in particular to a source for use in gamma radiography. Such a source has application, for example, in nondestructive testing, industrial gauging, densitometry and materials analysis in industry, research and medicine.

In the past, $^{75}$Se sources have been made by encapsulating elemental $^{74}$Se target material inside a welded metal target capsule. This is irradiated in a high flux reactor to convert some of the $^{74}$Se to $^{75}$Se. Typically, target capsules are made of low-activating metals, such as aluminum, titanium, vanadium and their alloys. Other expensive metals and alloys are also possible. The use of these metals ensures that impurity gamma rays arising from the activation of the target capsule are minimized. The $^{75}$Se is typically located within a cylindrical cavity inside the target capsule in the form of a pressed pellet or cast bead. To achieve good performance in radiography applications it is necessary for the focal spot size to be as small as possible and the activity to be as high as possible. This is achieved by irradiating in a very high neutron flux and by using very highly isotopically enriched $^{74}$Se target material, typically >95% enrichment.

After the irradiation, the activated target capsule is welded into one or more outer metal capsules to provide a leak-free source, which is free from external radioactive contamination.

Elemental selenium is chemically and physically volatile. It melts at 220° C. and boils at 680° C. It reacts with many metals, which might be suitable as low-activating capsule materials at temperatures above about 400° C., this includes titanium, vanadium and aluminum and their alloys. Selenium may react explosively with aluminum. This means that careful choice of target capsule material is required and the temperature of the target capsule during irradiation must be kept below about 400° C. to prevent the selenium reacting with, and corroding the target capsule wall. If this occurred, it would increase the focal spot size, distort the focal spot shape and reduce the wall thickness and strength of the target capsule.

An object of the present invention is to provide a source having a selenium target composition, which overcomes or ameliorates one or more of the problems associated with the use of elemental selenium, specifically the problems of achieving a thermally stable, non-volatile, non-reactive, high density, stable selenium target which nevertheless contains a very high density of selenium, comparable with the elemental form of the material.

The invention provides; in one of its aspects, a gamma radiation source comprising selenium-75 or a precursor therefore, wherein the selenium is provided in the form of one or more thermally stable compounds, alloys, or mixed metal phases with one or more metals (hereinafter referred to as acceptable metals or an acceptable metal) the neutron irradiation of which does not produce products capable of sustained emission of radiation which would unacceptably interfere with the gamma radiation of selenium-75.

Thus, for example, an acceptable metal, such as vanadium or rhodium, is activated but has no interfering gamma radiation. Molybdenum produces molybdenum-99 which does have interfering gamma radiation, but is very short lived and is therefore also an acceptable metal. Again, Thorium produces palladium-233 having a 27 day half life, but the gamma radiation of palladium-233 is 300–340 KeV which is very similar to selenium-75 and therefore acceptable.

Preferably, the said acceptable metal or metals is from the group comprising vanadium, molybdenum, rhodium, niobium, thorium, titanium, nickel, lead, bismuth, platinum, palladium, aluminum, or mixtures thereof. More preferably, the said acceptable metal or metals comprises one or a mixture of vanadium or molybdenum or rhodium.

Preferably, the selenium is provided in the form of a pellet or bead of a compound of formula $M_xSe_y$ where y/x is in the range 1–3 and M is one or a mixture of two or more of the said acceptable metals.

The preferred range for y/x is 1.5–2.5. More preferably, y/x is 2.

Preferably, the pellet or bead comprises $VSe_2$ or $MoSe_2$ or $Rh_2Se_5$.

Conveniently, elemental selenium is included in intimate admixture with the said compound, alloy or mixed metal phase to act as a binder therefore, in particular to facilitate formation of a dense, pore free pellet or bead.

For the safe containment of the active constituents, the pellet or bead is contained within a sealed, welded, metal capsule Preferably, the pellet or bead is formed to have a spherical or pseudo-spherical focal spot geometry.

The invention provides, in another of its aspects, a method of manufacturing a gamma radiation source comprising mixing selenium-74 and one or a mixture of metals from the group comprising vanadium, molybdenum, rhodium, niobium, thorium, titanium, nickel, lead, bismuth, platinum, palladium, aluminum, in appropriate proportions for the desired product compound, and heating the mixture to cause the constituents to inter-react and subsequently subjecting the reaction product to irradiation to convert at least a proportion of the selenium-74 to selenium-75.

A specific method and construction of a gamma radiation source embodying the invention will now be described by way of example with reference to the drawings filed herewith, in which.

Figure 1:
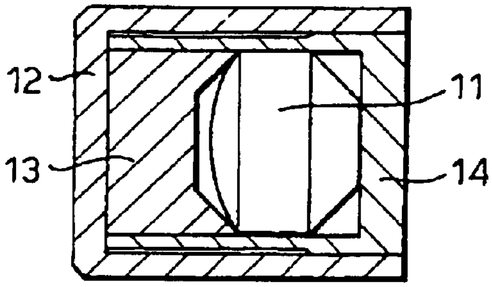
FIG. 1 is a sectional view of an irradiation capsule assembly.
Figure 2:
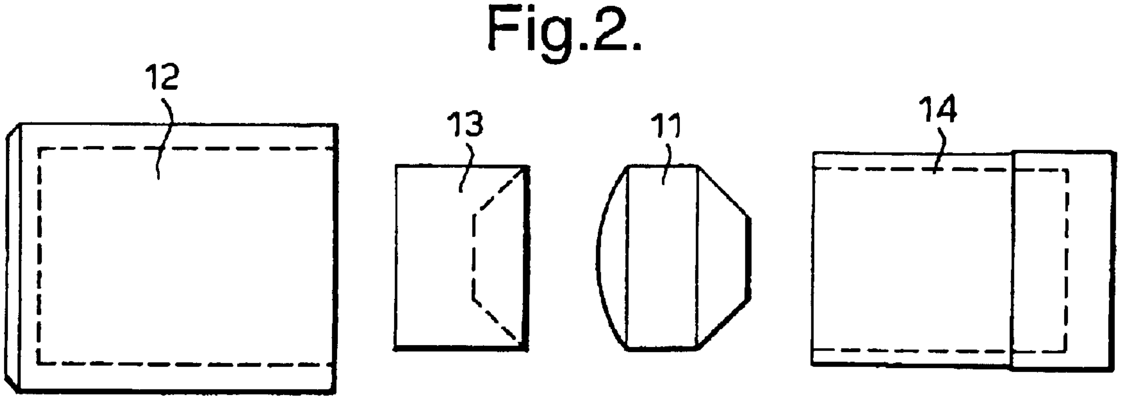
FIG. 2 is an exploded view of the components shown in FIG. 1.

Referring to FIGS. 1 and 2 of the drawings, a pellet 11 incorporating selenium-75 is hermetically sealed in the capsule comprising a cylindrical body 12, a cylindrical plug 13 and a cylindrical lid component 14 one end of which is of slightly increased diameter. Lid component 13 is wholly received within the body 12 and welded to the body 12 around that part which is of increased diameter. The pellet 11 is held within the capsule clamped between the plug 13 and lid component 14.

Figure 3:
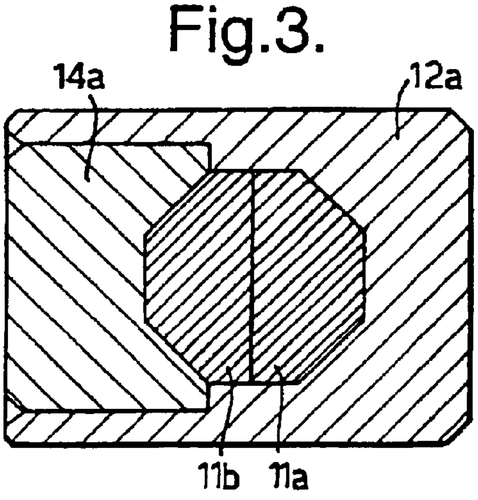
FIG. 3 is a sectional view of a modified irradiation capsule assembly.
Figure 4:
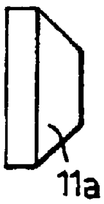
FIG. 4 is a side elevation of a component of the assembly shown in FIG. 3.

The modified assembly shown in FIGS. 3 and 4 is generally similar, but involves a reduced number of components. The capsule comprises a cylindrical body 12*a* and a cylindrical lid component 14*a* received in a correspondingly shaped recess in the body 12*a*. The lid 14*a* and body 12*a* are shaped internally to receive a pellet incorporating selenium-75 which is formed in two halves 11*a* and 11*b*, one of which, 11*a*, is shown in side elevation in FIG. 4. The pellet halves 11*a* and 11*b* also have a cylindrical geometry so that, whilst in the section shown the shape of the two halves put together forms an octagon, the shape in section at right angles to that shown is circular. After assembly the lid 14*a* is welded at 15 to the body 12*a*.

The pellet composition is a metal selenide compound (in which part or all may be regarded as an intimate mixture of metal particles and elemental selenium) having the composition $M_xSe_y$ in which M is an acceptable metal, which minimizes unwanted impurity gamma rays. Examples of suitable acceptable metals include, but are not limited to vanadium, molybdenum, rhodium, niobium, thorium, titanium, nickel, lead, bismuth, platinum, palladium, aluminum. The most preferred metals are molybdenum, vanadium and rhodium which produce especially dense metal-selenium phases, which are rich in selenium. "x" and "y" in the chemical formula can have any values depending on the valence state of the metal, but the highest selenium density is achieved when the ratio of y/x is in the range 1–3, more preferably 1.5–2.5, most preferably 2. Examples of suitable metal-selenium target materials are as follows:

| Valence | Examples |
|---|---|
| 2 | VSe, TiSe, PbSe, NiSe, BiSe |
| 2&3 | $Bi_3Se_4$ |
| 3 | $Bi_2Se_3$, $Al_2Se_3$ |
| 4 | $RhSe_2$, $VSe_2$, $TiSe_2$ $MoSe_2$, $PtSe_2$ $PdSe_2$, $NbSe_2$ $NiSe_2$ |
| 5 | $Rh_2Se_5$, $Th_2Se_5$ |
| 6 | $MoSe_3$ |

Metal-selenium pellet compositions can be prepared by a variety of methods. The method found to be most convenient, which gives rise to minimal process losses is to weigh out and mix a known quantity of enriched $^{74}Se$ powder with a calculated quantity of powdered metal, and to heat the mixture in an inert, sealed container, such as a flame sealed glass ampoule, gradually increasing the temperature over several hours to the reaction temperature and then holding that temperature for several more hours. For example, the reaction temperature for the reaction between $^{74}Se$ powder and vanadium powder is in the range 450° C.–550° C. In a specific example, a mixture of vanadium and selenium powders in the ratio one part vanadium to 1.9 parts enriched selenium-74 was heated in an evacuated flame sealed quartz ampoule, first at 550C. for 4 hours and then at 800C. for 100 hours. The product VSe.19 was pressed into half octagonal section pellets 11*a* and 11*b* of the form shown in FIG. 4.

Cylindrical pellets or beads can be prepared by several methods. For example, powder can be cold-pressed, hot-pressed or sintered to form cylindrical, spherical or pseudo-spherical geometries. These can be inserted into the target capsule, or cast or pressed in-situ. The capsule is then welded and leak tested prior to irradiation. Metal-selenium pellet compositions may consist of a pure metal selenide compound such as $VSe_2$, or a mixture of compounds such as $VSe_2$, $MoSe_2$, $MoSe_3$, or more complex phases obtained by reacting such mixtures together at high temperature. The composition may contain some metal powder and elemental selenium. Excess elemental selenium may be purposefully added as a bonding agent to bond metal selenide particles together to form pore free, high density pellets or beads. Pellets, which are made of mixtures, such as $VSe_2$+VSe+Se, or $MoSe_2$+$MoSe_3$+Se may react or sinter together within the target capsule, either during a special annealing process prior to irradiation, or during the irradiation itself, as follows:

$$VSe+Se=VSe_2 \text{ and } MoSe_2+Se=MoSe_3$$

One advantage of using metal selenide phases is that the thermal and physical stability of the materials enables unencapsulated pellets and beads to be irradiated, in-principle. This can provide significant cost advantages by reducing the amount of reactor space, which is wasted by the presence of the low activating target capsules.

The invention is not restricted to the details of the foregoing examples.

What is claimed is:

1. A gamma radiation source comprising selenium-75 which is combined with an acceptable metal or metals in the form of a stable compound, alloy, or mixed metal phase, the said acceptable metal or metals being a metal or metals the neutron irradiation of which does not produce products capable of sustained emission of radiation which would unacceptably interfere with the gamma radiation of selenium-75.

2. A source as claimed in claim 1, wherein the said acceptable metal or metals is from the group comprising vanadium, molybdenum, rhodium, niobium, thorium, titanium, nickel, lead, bismuth, platinum, palladium, aluminum, or mixtures thereof.

3. A source as claimed in claim 2, wherein the said acceptable metal or metals comprises one or a mixture of vanadium or molybdenum or rhodium.

4. A source as claimed in claim 2, wherein the selenium is provided in the form of a pellet or bead of a compound of formula $M_xSe_y$ where y/x is in the range 1–3 and M is one or a mixture of two or more of the said acceptable metals.

5. A source as claimed in claim 4, wherein y/x is in the range 1.5–2.5.

6. A source as claimed in claim 4, wherein y/x is 2.

7. A source as claimed in claim 4, wherein the pellet or bead comprises $VSe_2$ or $MoSe_2$ or $Rh_2Se_5$.

8. A source as claimed in claim 2, wherein there is included elemental selenium in intimate admixture with the said compound, alloy or mixed metal phase to act as a binder therefore.

9. A source as claimed in claim 2, wherein the said compound, alloy or mixed metal phase is in the form of a dense, pore free pellet or bead.

10. A source as claimed in claim 9, wherein the pellet or bead is contained within a sealed, welded, metal capsule.

11. A source as claimed in claim 9, wherein the pellet or bead is formed to have a spherical or pseudo-spherical focal spot geometry.

12. A source as claimed in claim 11, wherein the pellet or bead is formed to have a geometry which is octagonal in one section and circular in the transverse section.

13. A method of manufacturing a gamma radiation source comprising mixing selenium-74 and one or a mixture of metals from the group comprising vanadium, molybdenum, rhodium, niobium, thorium, titanium, nickel, lead, bismuth, platinum, palladium, aluminum, in appropriate proportions for the desired product compound, and heating the mixture to cause the constituents to inter-react and subsequently subjecting the reaction product to irradiation to convert at least a proportion of the selenium-74 to selenium-75.

14. A precursor for a gamma radiation source comprising isotopicallv enriched selenium-74 which combined with an acceptable metal or metals in the form of a stable alloy, compound, or mixed metal phase in an encapsulation, the encapsulation and its contents being adapted for irradiation with neutrons to convert at least some of the selenium-74 to selenium-75 whilst not at the same time producing any products capable of sustained emission of radiation which would unacceptably interfere with the gamma radiation of selenium-75.

15. A precursor as claimed in claim 14, wherein the said acceptable metal or metals is from the group comprising vanadium, molybdenum, rhodium, niobium, thorium, titanium, nickel, lead, bismuth, platinum, palladium, aluminum, or mixtures thereof.

16. A precursor as claimed in claim 15, wherein the said acceptable metal or metals comprises one or a mixture of vanadium or molybdenum or rhodium.

17. A precursor as claimed in claim 15, wherein the selenium is provided in the form of a pellet or bead of a compound of formula $M_xSe_y$ where y/x is in the range 1–3 and M is one or a mixture of two or more of the said acceptable metals.

18. A precursor as claimed in claim 17, wherein y/x is in the range 1.5–2.5.

19. A precursor as claimed in claim 17, wherein y/x is 2.

20. A precursor as claimed in claim 17, wherein the pellet or bead comprises $VSe_2$ or $MoSe_2$ or $Rh_2Se_5$.

21. A precursor as claimed in claim 15, wherein there is included elemental selenium in intimate admixture with the said compound, alloy or mixed metal phase to act as a binder therefore.

22. A precursor as claimed in claim 15, wherein the said compound, alloy or mixed metal phase is in the form of a dense, pore free pellet or bead.

23. A precursor as claimed in claim 22, wherein the pellet or bead is contained within a sealed, welded, metal capsule.

24. A precursor as claimed in claim 22, wherein the pellet or bead is formed to have a spherical or pseudo-spherical focal spot geometry.

25. A precursor as claimed in claim 24, wherein the pellet or bead is formed to have a geometry which is octagonal in one section and circular in the transverse section.

* * * * *

UNITED STATES PATENT AND TRADEMARK OFFICE

CERTIFICATE OF CORRECTION

PATENT NO. : 6,875,377 C1
APPLICATION NO. : 95/000582
DATED : February 11, 2013
INVENTOR(S) : Mark Golder Shilton It is certified that error appears in the above-identified patent and that said Letters Patent is hereby corrected as shown below:

Title Page, Item (73) Assignee: "OSA Global, Inc., Burlington, MA (US)"
Should read --QSA Global, Inc., Burlington, MA (US)--.

Signed and Sealed this
Nineteenth Day of March, 2013

Teresa Stanek Rea
*Acting Director of the United States Patent and Trademark Office*

US006875377C1

(12) INTER PARTES REEXAMINATION CERTIFICATE (524th)

United States Patent

Shilton

(10) Number: US 6,875,377 C1

(45) Certificate Issued: Feb. 11, 2013

(54) GAMMA RADIATION SOURCE

(75) Inventor: Mark Golder Shilton, Aston Clinton (GB)

(73) Assignee: OSA Global, Inc., Burlington, MA (US)

Reexamination Request:
No. 95/000,582, Dec. 17, 2010

Reexamination Certificate for:

| | |
|---|---|
| Patent No.: | **6,875,377** |
| Issued: | **Apr. 5, 2005** |
| Appl. No.: | **09/959,125** |
| Filed: | **Oct. 22, 2001** |

(21) Appl. No.: 95/000,582

(22) PCT Filed: Apr. 20, 2000

(86) PCT No.: PCT/GB00/01549

§ 371 (c)(1), (2), (4) Date: Oct. 22, 2001

(87) PCT Pub. No.: WO00/65608

PCT Pub. Date: Nov. 2, 2000

(30) Foreign Application Priority Data

Apr. 27, 1999 (GB) .................................... 9909531

(51) Int. Cl.
*G21G 4/00* (2006.01)
*G21G 4/06* (2006.01)

(52) U.S. Cl. ................ 252/644; 250/390.01; 250/496.1; 252/625; 252/645; 420/1; 420/424; 420/429; 420/462; 420/579; 423/508; 423/509; 423/510

(58) Field of Classification Search ........................ None
See application file for complete search history.

(56) References Cited

To view the complete listing of prior art documents cited during the proceeding for Reexamination Control Number 95/000,582, please refer to the USPTO's public Patent Application Information Retrieval (PAIR) system under the Display References tab.

*Primary Examiner* — Elizabeth McKane

(57) ABSTRACT

A gamma radiation source comprising selenium-75 or a precursor therefore, wherein the selenium is provided in the form of one or more thermally stable compounds, alloys, or mixed metal phases.

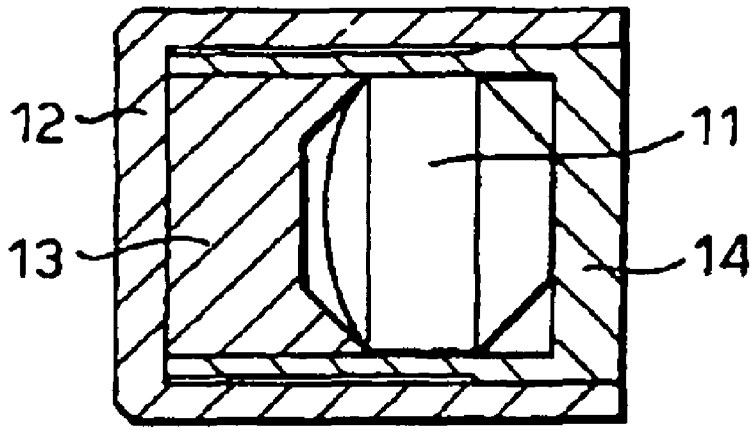

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 13-15 is confirmed.

Claims 1 and 2 are cancelled.

Claims 3-12 and 16-25 were not reexamined.

* * * * *

US006875377C2

(12) EX PARTE REEXAMINATION CERTIFICATE (10462nd)
United States Patent
Shilton

(10) Number: US 6,875,377 C2
(45) Certificate Issued: Jan. 5, 2015

(54) GAMMA RADIATION SOURCE

(75) Inventor: Mark Golder Shilton, Aston Clinton (GB)

(73) Assignee: QSA Global, Inc., Burlington, MA (US)

Reexamination Request:
No. 90/012,919, Jul. 16, 2013

Reexamination Certificate for:
Patent No.: 6,875,377
Issued: Apr. 5, 2005
Appl. No.: 09/959,125
Filed: Oct. 22, 2001

Reexamination Certificate C1 6,875,377 issued Feb. 11, 2013

Certificate of Correction issued Mar. 19, 2013

(21) Appl. No.: 90/012,919

(22) PCT Filed: Apr. 20, 2000

(86) PCT No.: PCT/GB00/01549
§ 371 (c)(1),
(2), (4) Date: Oct. 22, 2001

(87) PCT Pub. No.: WO00/65608
PCT Pub. Date: Nov. 2, 2000

(30) Foreign Application Priority Data

Apr. 27, 1999 (GB) .................................... 9909531

(51) Int. Cl.
*G21G 4/00* (2006.01)
*G21G 4/06* (2006.01)

(52) U.S. Cl.
CPC ........................................ *G21G 4/06* (2013.01)
USPC ...... 252/644; 252/625; 252/645; 250/390.01; 250/496.1; 420/1; 420/424; 420/429; 420/462; 420/579; 423/508; 423/509; 423/510

(58) Field of Classification Search
None
See application file for complete search history.

(56) References Cited

To view the complete listing of prior art documents cited during the proceeding for Reexamination Control Number 90/012,919, please refer to the USPTO's public Patent Application Information Retrieval (PAIR) system under the Display References tab.

*Primary Examiner* — Elizabeth McKane

(57) ABSTRACT

A gamma radiation source comprising selenium-75 or a precursor therefore, wherein the selenium is provided in the form of one or more thermally stable compounds, alloys, or mixed metal phases.

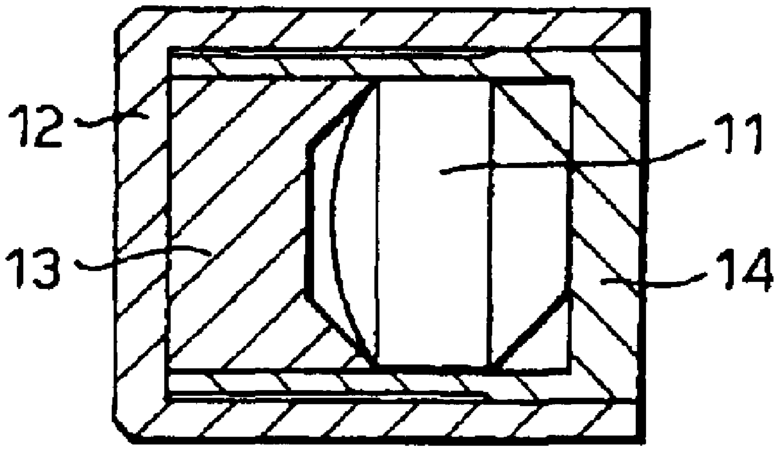

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3 and 14-16 is confirmed.

Claims 1 and 2 were previously cancelled.

Claim 13 is determined to be patentable as amended.

New claims 26-29 are added and determined to be patentable.

Claims 4-12 and 17-25 were not reexamined.

13. A method of manufacturing a gamma radiation source comprising mixing selenium-74 and one or a mixture of metals from the group comprising vanadium, molybdenum, rhodium, niobium, thorium, titanium, nickel, lead, bismuth, platinum, palladium, aluminum, in appropriate proportions for the desired *metal-selenide* product compound, and heating the mixture to cause the [constituents] *selenium-74 and the one or the mixture of metals* to inter-react *to form the desired metal-selenide product compound* and subsequently subjecting the [reaction] *metal-selenide* product *compound* to *neutron* irradiation to convert at least a proportion of the selenium-74 to selenium-75.

*26. A source as claimed in claim 3 wherein the source is encapsulated as a gamma radiation source in radiography.*

*27. A method as claimed in claim 13 further including the step of encapsulating the irradiated reaction product as a gamma radiation source in radiography.*

*28. A precursor as claimed in claim 14 wherein the resulting gamma radiation source emits sufficient radiation to be adapted as a gamma radiation source in radiography.*

*29. The method of manufacturing of claim 13 wherein the metal or metals is chosen from the group consisting of vanadium, molybdenum and rhodium.*

* * * * *